UNITED STATES PATENT OFFICE.

ROLAND SCHOLL, OF GRATZ, AUSTRIA-HUNGARY, AND MAX HENRY ISLER, OF MANNHEIM, GERMANY, ASSIGNORS TO BADISCHE ANILIN & SODA FABRIK, OF LUDWIGSHAFEN-ON-THE-RHINE, GERMANY, A CORPORATION.

ANTHRACENE DYE AND PROCESS OF MAKING.

955,105.     Specification of Letters Patent.     Patented Apr. 12, 1910.

No Drawing.     Application filed December 14, 1909. Serial No. 533,105.

*To all whom it may concern:*

Be it known that we ROLAND SCHOLL, Ph. D., professor of chemistry, a subject of the Emperor of Austria-Hungary, residing at Gratz, Austria-Hungary, and MAX HENRY ISLER, chemist, a citizen of the Swiss Republic, residing at Mannheim, Germany, have invented new and useful Improvements in Anthracene Dyes and Processes of Making Same, of which the following is a specification.

In Letters Patent No. 876,810 is described generically the production of halogenated coloring matters of the anthracene series by heating with halogen the coloring matter resulting on treating a 2.2'-dimethyl-1.1'-dianthraquinonyl compound with a condensing agent, and specifically the new chlorinated coloring matter which can be obtained by treating the said intermediate non-halogenated coloring matter with sulfuryl chlorid. We have now discovered a new brominated coloring matter which possesses similar generic properties to those of the coloring matters described in the said Letters Patent, but which is different from any of the coloring matters described specifically, in that the shades which it produces on cotton, when dyed from a hydrosulfite vat, are very considerably redder and more brilliant than the shades produced by the said specifically claimed coloring matter, and moreover contains two atomic proportions of bromin and is free from chlorin.

We produce our new coloring matter by treating with bromin the coloring matter which can be obtained by treating 2.2'-dimethyl-1.1'-dianthraquinonyl with a condensing agent and carrying out such treatment so that at least two atomic proportions of bromin are introduced into the molecule, and we preferably carry out the bromination in the presence of nitrobenzene, although this latter is not absolutely necessary.

The following example will serve to illustrate further the nature of this invention and the method of carrying it into practical effect, but the invention is not limited to this example. The parts are by weight.

Boil together, for from one, to two, hours, in a reflux apparatus, ten parts of the coloring matter obtainable according to Example 7 of the specification of British Letters Patent No. 14,578/05, one hundred, to two hundred, parts of nitrobenzene and twenty-four parts of bromin. If desired, the reaction can be carried out at a considerably lower temperature, but it then requires a longer period for completion. When the mixture is cold, filter off the coloring matter and free it from nitrobenzene, for instance by washing it with alcohol. The coloring matter can be obtained in the condition of a paste by dissolving it in concentrated sulfuric acid and precipitating it from this solution by the addition of water. It yields a blue solution in concentrated sulfuric acid, and the color of this solution is unaltered on the addition of boric acid. It is very difficultly soluble in most solvents, but in alkaline hydrosulfite solution it yields a carmin-red vat, which colors cotton brilliant carmin shades which, upon exposure to the air, or on washing, become reddish orange. The coloring matter appears to be a dibrom derivative.

Now what we claim is:—

1. The process of producing anthracene coloring matter by treating with bromin in the presence of nitrobenzene, the coloring matter obtainable by heating 2.2'-dimethyl-1.1'-dianthraquinonyl with a condensing agent, substantially as hereinbefore described.

2. As a new article of manufacture, the anthracene coloring matter which can be obtained by treating with bromin in the presence of nitrobenzene the coloring matter which can be obtained by heating 2.2'-dimethyl-1.1'-dianthraquinonyl with a condensing agent, which new coloring matter contains two atomic proportions of bromin and is a brown powder insoluble in water and in dilute acids and alkalies and is soluble in concentrated sulfuric acid with a blue color and in alkaline hydrosulfite yielding a cherry red vat which produces on cotton blue-red shades, which shades on washing are converted into brilliant orange-red.

In testimony whereof we have hereunto set our hands in the presence of two subscribing witnesses.

ROLAND SCHOLL.
MAX HENRY ISLER.

Witnesses to the signature of Roland Scholl:
MIGUEL PFANNL,
ERNST PHILIPPI.

Witnesses to the signature of Max Henry Isler:
J. ALEC. LLOYD,
W. W. SCHMIDT.